United States Patent
Padhye et al.

(10) Patent No.: US 12,248,666 B2
(45) Date of Patent: Mar. 11, 2025

(54) SIMPLIFYING CONFIGURATION OF METRICS WITH DATA PREVIEW

(71) Applicant: Cisco Technology, Inc., San Jose, CA (US)

(72) Inventors: Jaideep Padhye, San Jose, CA (US); Daniel Quinn Erwin, Oakland, CA (US); Vishweshwar Ghanakota, Cardiff, CA (US); Tom Thekkel Jose, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/218,340

(22) Filed: Jul. 5, 2023

(65) Prior Publication Data

US 2025/0013356 A1    Jan. 9, 2025

(51) Int. Cl.
*G06F 3/04842* (2022.01)
*G06F 9/451* (2018.01)

(52) U.S. Cl.
CPC .......... *G06F 3/04842* (2013.01); *G06F 9/451* (2018.02)

(58) Field of Classification Search
CPC .............................. G06F 3/04842; G06F 9/451
See application file for complete search history.

(56) References Cited

U.S. PATENT DOCUMENTS

| | | |
|---|---|---|
| 7,162,390 B2 | 1/2007 | Jowett et al. |
| 8,538,934 B2 | 9/2013 | Hudis et al. |
| 2009/0044096 A1* | 2/2009 | Gupta ................. G06F 8/51 715/230 |
| 2017/0262460 A1* | 9/2017 | Nordstrom .......... H04L 41/0631 |
| 2018/0322437 A1* | 11/2018 | McClory ................. G06F 8/30 |
| 2020/0311160 A1 | 10/2020 | Blank, Jr. et al. |
| 2021/0365312 A1 | 11/2021 | Devaraju |
| 2022/0200968 A1* | 6/2022 | Helmick ................ H04L 9/0825 |
| 2023/0367694 A1* | 11/2023 | Kholodkov ............. G06F 17/40 |

OTHER PUBLICATIONS

Shi Mengxin et al., Forecasting Sudden Changes in Telemetry Data from Satellite Control System, Nov. 20, 2020, IEEE 9th Data Driven Control and Learning System Conference, pp. 1-6 (Year: 2020).*

(Continued)

*Primary Examiner* — Tam T Tran
(74) *Attorney, Agent, or Firm* — BEHMKE INNOVATION GROUP LLC; James M. Behmke; James J. Wong

(57) ABSTRACT

In one embodiment, a device identifies a set of attributes from telemetry data generated by one or more agents regarding an online application accessible via a network. The device provides an interactive display to a user interface that includes options for a user to specify a selection of one or more attributes from the set of attributes and to specify an aggregation function. The device updates the interactive display to show a visualization of the aggregation function applied to the selection of one or more attributes and configures the one or more agents to collect only a subset of the telemetry data based on the selection of the one or more attributes and the aggregation function.

20 Claims, 9 Drawing Sheets

(56) References Cited

OTHER PUBLICATIONS

Shuangyan Shen, Realization of Joint Visualization of Telemetry Data, Oct. 28, 2022, IEEE 2nd International Conference on Data Science and Computer Application, pp. 1-3 (Year: 2022).*

"Splunking NetFlow with Splunk Stream—Part 1: Getting NetFlow data into Splunk", online: https://www.splunk.com/en_us/blog/tips-and-tricks/splunking-netflow-with-splunk-stream-part-1-getting-netflow-data-into-splunk.html, Oct. 2021, accessed Jun. 26, 2023, 11 pages.

"Hightouch | Start syncing data in minutes", online: https://hightouch.com/, accessed Jun. 26, 2023, 17 pages.

"Connecting to Datadog", online: https://docs.datadistillr.com/connecting-data/connecting-to-apis-and-external-data/datadog-api/, accessed Jun. 26, 2023, 11 pages, DataDistillr.

"Create a DSP connection to Amazon CloudWatch", online: https://docs.splunk.com/Documentation/DSP/1.3.0/Connection/AWSCloudWatchConnect, accessed Jun. 26, 2023, 4 pages, Splunk Inc.

Doan, et al., "Query Previews in Networked Information Systems", Proceedings of ADL, 1996, pp. 120-129, IEEE.

\* cited by examiner

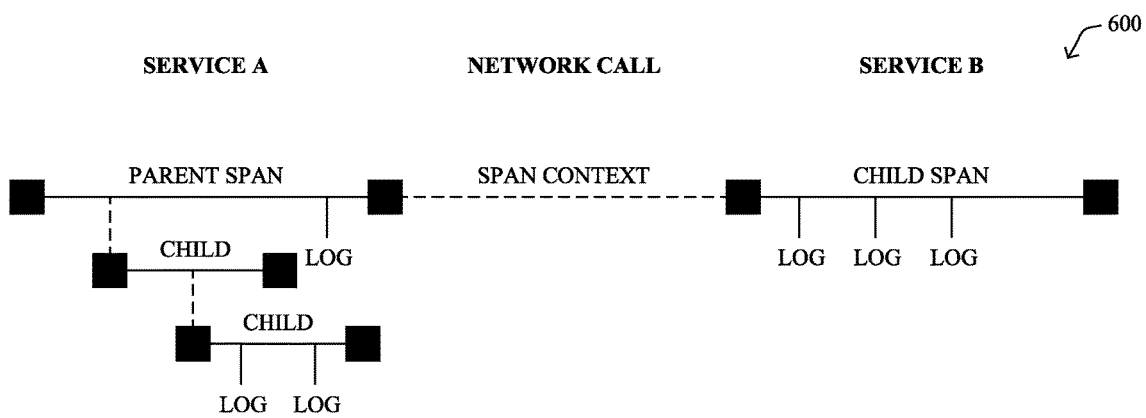

1. Trace: The description of a transaction as it moves through a distributed system.

2. Span: A named, timed operation representing a piece of the workflow. Spans accept key:value tags as well as fine-grained, timestamped, structured logs attached to the particular span instance.

3. Span context: Trace information that accompanies the distributed transaction, including when it passes the service to service over the network or through a message bus. The span context contains the trace identifier, span identifier, and any other data that the tracing system needs to propagate to the downstream service.

FIG. 6

SIMPLIFYING CONFIGURATION OF METRICS WITH DATA PREVIEW

TECHNICAL FIELD

The present disclosure relates generally to computer networks, and, more particularly, to simplifying configuration of metrics with data preview.

BACKGROUND

Network observability tools provide the ability to use diverse sources of data to gain insight into the internal happenings of a network and how business objectives and user experience are impacted by internal network states. The goal of network observability tools is to provide a user or system administrator of the network information that can be used to answer questions about the network (e.g., data streams, network states, etc.). This ability has become increasingly important in recent years due to the explosion in complexity of networking configurations and architectures.

Currently, network observability tools require a user or system administrator to have a detailed and up-to-date understanding of the existing data stream(s) in the network, to configure the network observability tool to ingest and analyze the data of interest. In many cases, having such a detailed and up-to-date understanding of the existing data stream(s) in the network can be difficult, time-consuming, and may even require trial and error. It is also possible that these constraints can make configuration of the network observability tool confusing and complicated, leading to misconfigurations.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 6 illustrates an example of a distributed transaction;

DESCRIPTION OF EXAMPLE EMBODIMENTS

Overview

Figure 1A:
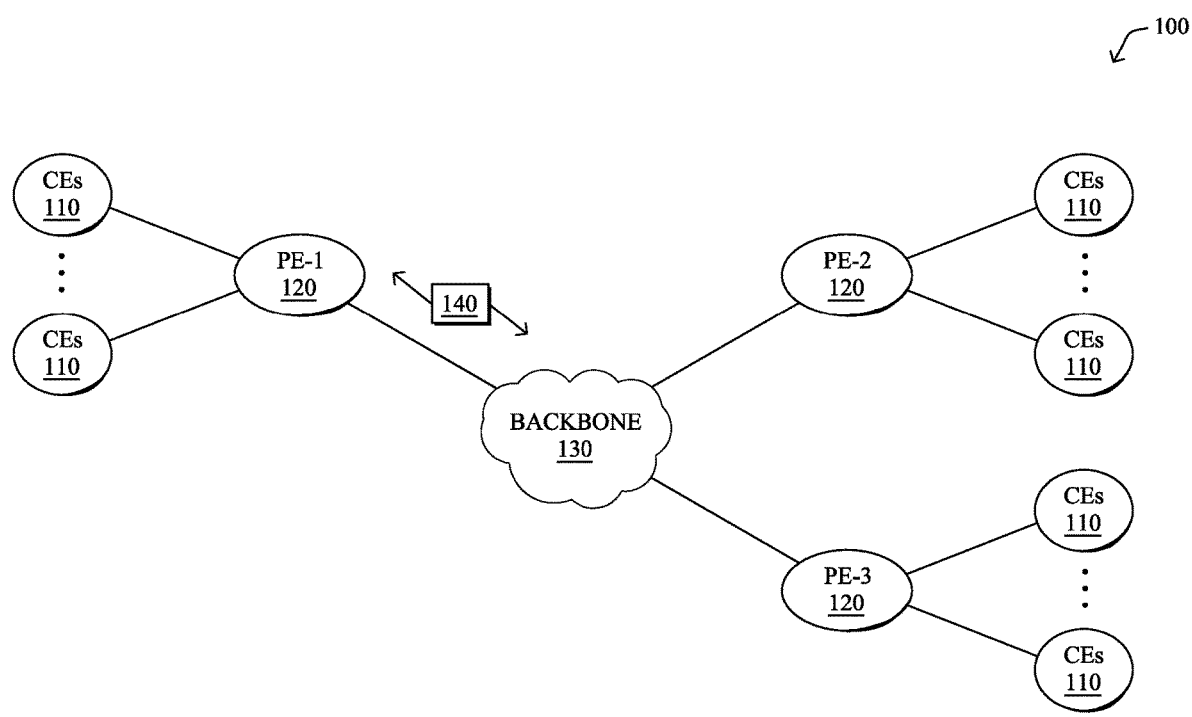
FIGS. 1A-1B illustrate an example computer network.

According to one or more embodiments of the disclosure, a device identifies a set of attributes from telemetry data generated by one or more agents regarding an online application accessible via a network. The device provides an interactive display to a user interface that includes options for a user to specify a selection of one or more attributes from the set of attributes and to specify an aggregation function. The device updates the interactive display to show a visualization of the aggregation function applied to the selection of one or more attributes and configures the one or more agents to collect only a subset of the telemetry data based on the selection of the one or more attributes and the aggregation function.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network.

The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or power-line communication networks. That is, in addition to one or more sensors, each sensor device (node) in a sensor network may generally be equipped with a radio transceiver or other communication port, a microcontroller, and an energy source, such as a battery. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics.

Figure 1B:
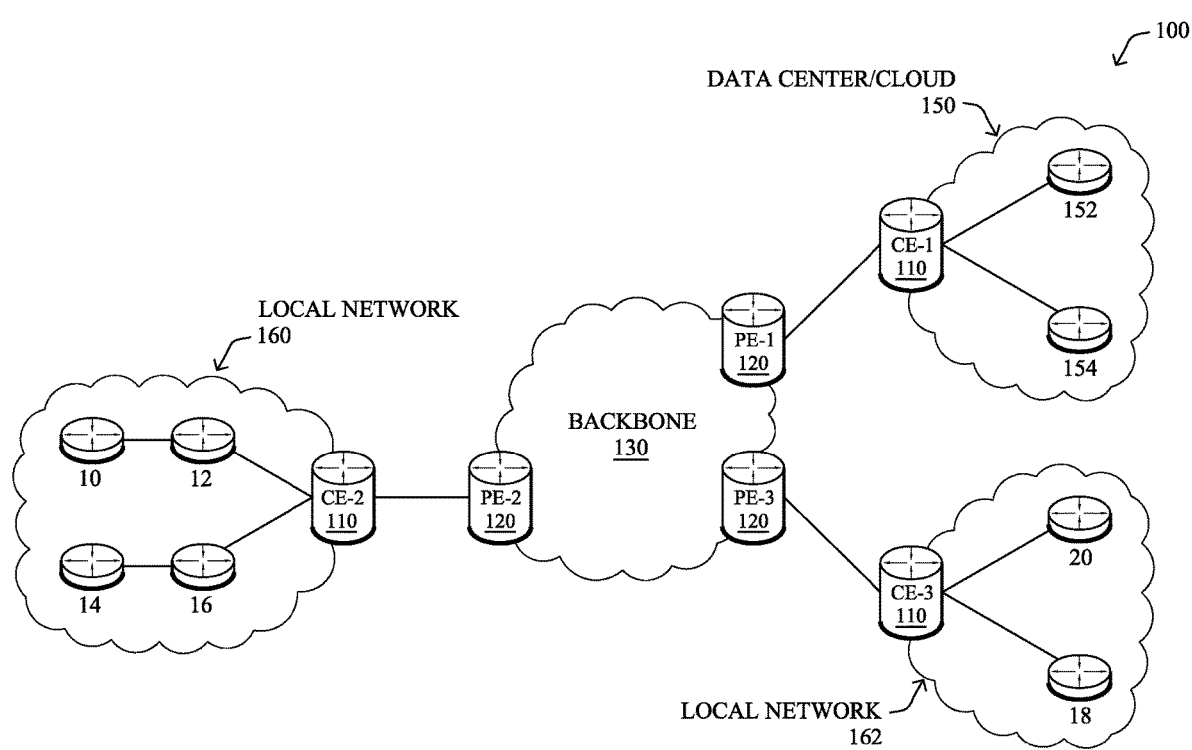

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include nodes/devices 10-16 and devices/nodes 18-20, respectively, as well as a data center/cloud environment 150 that includes servers 152-154. Notably, local networks 160-162 and data center/cloud environment 150 may be located in different geographic locations. Servers 152-154 may include, in various embodiments, any number of suitable servers or other cloud-based resources. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc. Furthermore, in various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
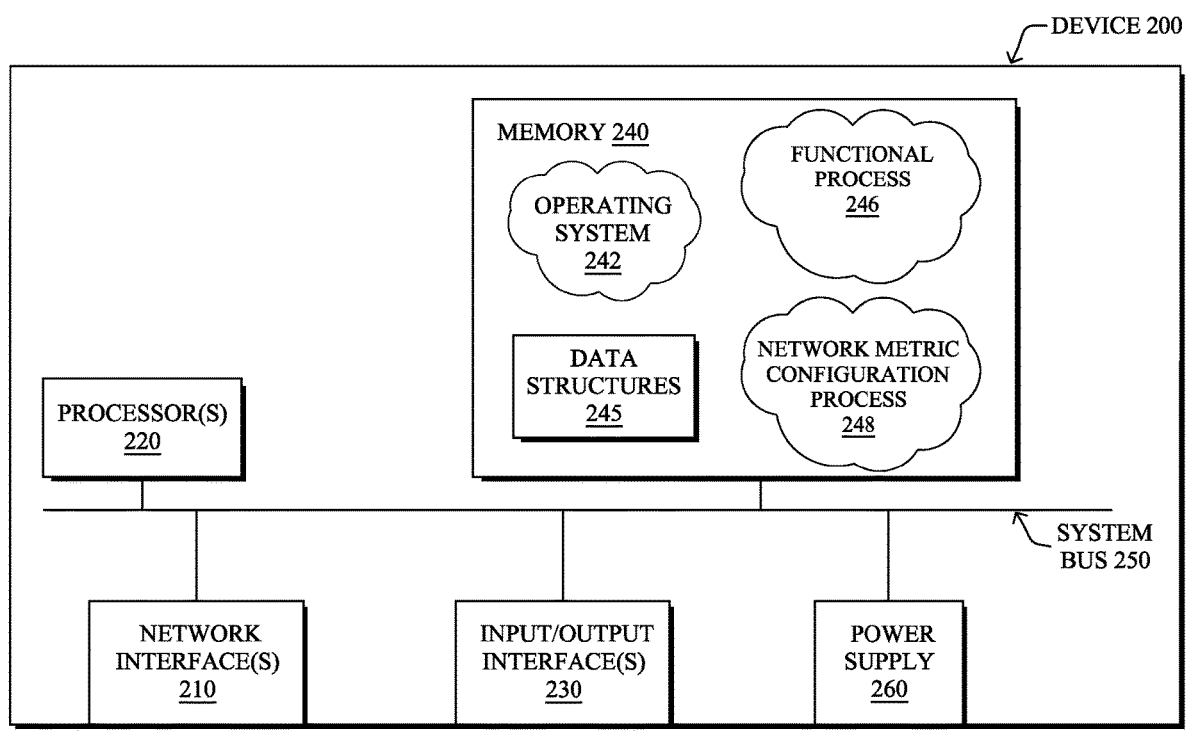
FIG. 2 illustrates an example computing device/node.

FIG. 2 is a schematic block diagram of an example computing device (e.g., apparatus) 200 that may be used with one or more embodiments described herein, e.g., as any of the devices shown in FIGS. 1A-1B above, and particularly as specific devices as described further below. The device may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100, e.g., providing a data connection between device 200 and the data network, such as the Internet. The network interfaces may be configured to transmit and/or receive data using a variety of different communication protocols. For example, interfaces 210 may include wired transceivers, wireless transceivers, cellular transceivers, or the like, each to allow device 200 to communicate information to and from a remote computing device or server over an appropriate network. The same network interfaces 210 also allow communities of multiple devices 200 to interconnect among themselves, either peer-to-peer, or up and down a hierarchy. Note, further, that the nodes may have two different types of network connections via network interface(s) 210, e.g., wireless and wired/physical connections, and that the view herein is merely for illustration. Also, while network interface(s) 210 are shown separately from power supply 260, for devices using powerline communication (PLC) or Power over Ethernet (PoE), the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes 246, and on certain devices, an illustrative network metric configuration process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Application Intelligence Platform

The embodiments herein relate to an application intelligence platform for application performance management. In one aspect, as discussed with respect to FIGS. 3-5 below, performance within a networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information). The agent-collected data may then be provided to one or more servers or controllers to analyze the data.

Figure 3:
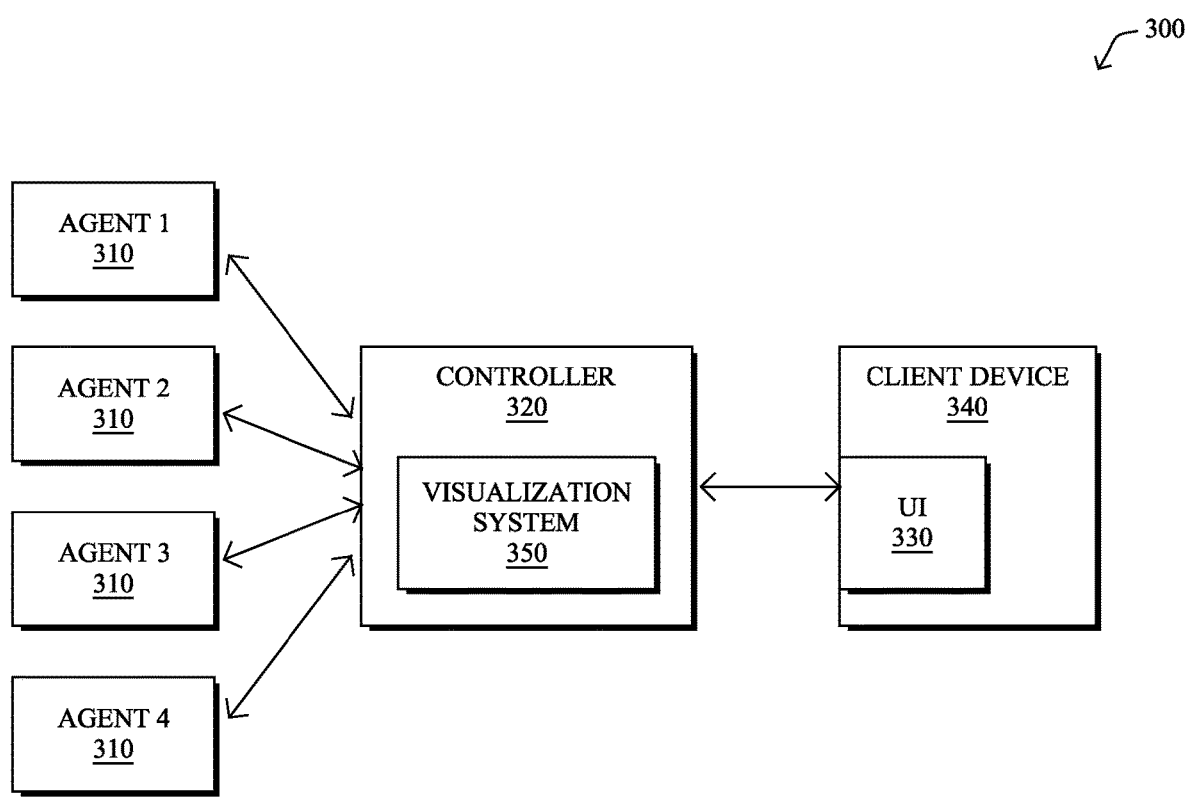
FIG. 3 illustrates an example application intelligence platform.

FIG. 3 is a block diagram of an example application intelligence platform 300 that can implement one or more aspects of the techniques herein. The application intelligence platform is a system that monitors and collects metrics of performance data for an application environment being monitored. At the simplest structure, the application intelligence platform includes one or more agents 310 and one or more servers/controllers 320. Note that while FIG. 3 shows four agents (e.g., Agent 1 through Agent 4) communicatively linked to a single controller, the total number of agents and controllers can vary based on a number of factors including the number of applications monitored, how distributed the application environment is, the level of monitoring desired, the level of user experience desired, and so on.

The controller 320 is the central processing and administration server for the application intelligence platform. The controller 320 serves a browser-based user interface 330 (UI) that is the primary interface for monitoring, analyzing, and troubleshooting the monitored environment. The controller 320 can control and manage monitoring of business transactions (described below) distributed over application servers. Specifically, the controller 320 can receive runtime data from agents 310 (and/or other coordinator devices), associate portions of business transaction data, communicate with agents to configure collection of runtime data, and provide performance data and reporting through the user interface 330. The user interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, a controller instance may be hosted remotely by a provider of the application intelligence platform 300. In an illustrative on-premises (On-Prem) implementation, a controller instance may be installed locally and self-administered.

The controllers 320 receive data from different agents 310 (e.g., Agents 1-4) deployed to monitor applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Database agents query the monitored databases in order to collect metrics and pass those metrics along for display in a metric browser (e.g., for database monitoring and analysis within databases pages of the controller's user interface 330). Multiple database agents can report to the same controller. Additional database agents can be implemented as backup database agents to take over for the primary database agents during a failure or planned machine downtime. The additional database agents can run on the same machine as the primary agents or on different machines. A database agent can be deployed in each distinct network of the monitored environment. Multiple database agents can run under different user accounts on the same machine.

Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. A standalone machine agent has an extensible architecture (e.g., designed to accommodate changes).

End user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs. Notably, browser agents (e.g., agents 310) can include Reporters that report monitored data to the controller.

Monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases.

A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Application Intelligence Monitoring: The disclosed technology can provide application intelligence data by monitoring an application environment that includes various services such as web applications served from an application server (e.g., Java virtual machine (JVM), Internet Information Services (IIS), Hypertext Preprocessor (PHP) Web server, etc.), databases or other data stores, and remote services such as message queues and caches. The services in the application environment can interact in various ways to provide a set of cohesive user interactions with the application, such as a set of user services applicable to end user customers.

Application Intelligence Modeling: Entities in the application environment (such as the JBoss service, MQSeries modules, and databases) and the services provided by the entities (such as a login transaction, service or product search, or purchase transaction) may be mapped to an application intelligence model. In the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

Business Transactions: a business transaction representation of the particular service provided by the monitored environment provides a view on performance data in the context of the various tiers that participate in processing a particular request. A business transaction, which may each be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)).

Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

A business application is the top-level container in the application intelligence model. A business application contains a set of related services and business transactions. In some implementations, a single business application may be needed to model the environment. In some implementations, the application intelligence model of the application environment can be divided into several business applications. Business applications can be organized differently based on the specifics of the application environment. One consideration is to organize the business applications in a way that reflects work teams in a particular organization, since role-based access controls in the Controller UI are oriented by business application.

A node in the application intelligence model corresponds to a monitored server or JVM in the application environment. A node is the smallest unit of the modeled environment. In general, a node corresponds to an individual application server, JVM, or Common Language Runtime (CLR) on which a monitoring Agent is installed. Each node identifies itself in the application intelligence model. The Agent installed at the node is configured to specify the name of the node, tier, and business application under which the Agent reports data to the Controller.

Business applications contain tiers, the unit in the application intelligence model that includes one or more nodes. Each node represents an instrumented service (such as a web application). While a node can be a distinct application in the application environment, in the application intelligence model, a node is a member of a tier, which, along with possibly many other tiers, make up the overall logical business application.

Tiers can be organized in the application intelligence model depending on a mental model of the monitored application environment. For example, identical nodes can be grouped into a single tier (such as a cluster of redundant servers). In some implementations, any set of nodes, identical or not, can be grouped for the purpose of treating certain performance metrics as a unit into a single tier.

The traffic in a business application flows among tiers and can be visualized in a flow map using lines among tiers. In addition, the lines indicating the traffic flows among tiers can be annotated with performance metrics. In the application intelligence model, there may not be any interaction among nodes within a single tier. Also, in some implementations, an application agent node cannot belong to more than one tier. Similarly, a machine agent cannot belong to more than one tier. However, more than one machine agent can be installed on a machine.

A backend is a component that participates in the processing of a business transaction instance. A backend is not instrumented by an agent. A backend may be a web server, database, message queue, or other type of service. The agent recognizes calls to these backend services from instrumented code (called exit calls). When a service is not instrumented and cannot continue the transaction context of the call, the agent determines that the service is a backend component. The agent picks up the transaction context at the response at the backend and continues to follow the context of the transaction from there.

Performance information is available for the backend call. For detailed transaction analysis for the leg of a transaction processed by the backend, the database, web service, or other application need to be instrumented.

The application intelligence platform uses both self-learned baselines and configurable thresholds to help identify application issues. A complex distributed application has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed application intelligence platform can perform anomaly detection based on dynamic baselines or thresholds.

The disclosed application intelligence platform automatically calculates dynamic baselines for the monitored metrics, defining what is "normal" for each metric based on actual usage. The application intelligence platform uses these baselines to identify subsequent metrics whose values fall out of this normal range. Static thresholds that are tedious to set up and, in rapidly changing application environments, error-prone, are no longer needed.

The disclosed application intelligence platform can use configurable thresholds to maintain service level agreements (SLAs) and ensure optimum performance levels for system by detecting slow, very slow, and stalled transactions. Configurable thresholds provide a flexible way to associate the right business context with a slow request to isolate the root cause.

In addition, health rules can be set up with conditions that use the dynamically generated baselines to trigger alerts or initiate other types of remedial actions when performance problems are occurring or may be about to occur.

For example, dynamic baselines can be used to automatically establish what is considered normal behavior for a particular application. Policies and health rules can be used against baselines or other health indicators for a particular application to detect and troubleshoot problems before users are affected. Health rules can be used to define metric conditions to monitor, such as when the "average response time is four times slower than the baseline". The health rules can be created and modified based on the monitored application environment.

Examples of health rules for testing business transaction performance can include business transaction response time and business transaction error rate. For example, health rule that tests whether the business transaction response time is much higher than normal can define a critical condition as the combination of an average response time greater than the default baseline by 3 standard deviations and a load greater than 50 calls per minute. In some implementations, this health rule can define a warning condition as the combination of an average response time greater than the default baseline by 2 standard deviations and a load greater than one hundred calls per minute. In some implementations, the health rule that tests whether the business transaction error rate is much higher than normal can define a critical condition as the combination of an error rate greater than the default baseline by 3 standard deviations and an error rate greater than 10 errors per minute and a load greater than 50 calls per minute. In some implementations, this health rule can define a warning condition as the combination of an error rate greater than the default baseline by 2 standard deviations and an error rate greater than 5 errors per minute and a load greater than 50 calls per minute. These are non-exhaustive and non-limiting examples of health rules and other health rules can be defined as desired by the user.

Policies can be configured to trigger actions when a health rule is violated or when any event occurs. Triggered actions can include notifications, diagnostic actions, auto-scaling capacity, running remediation scripts.

Most of the metrics relate to the overall performance of the application or business transaction (e.g., load, average response time, error rate, etc.) or of the application server infrastructure (e.g., percentage CPU busy, percentage of memory used, etc.). The Metric Browser in the controller UI can be used to view all of the metrics that the agents report to the controller.

In addition, special metrics called information points can be created to report on how a given business (as opposed to a given application) is performing. For example, the performance of the total revenue for a certain product or set of products can be monitored. Also, information points can be used to report on how a given code is performing, for example how many times a specific method is called and how long it is taking to execute. Moreover, extensions that use the machine agent can be created to report user defined custom metrics. These custom metrics are base-lined and reported in the controller, just like the built-in metrics.

All metrics can be accessed programmatically using a Representational State Transfer (REST) API that returns either the JavaScript Object Notation (JSON) or the eXtensible Markup Language (XML) format. Also, the REST API can be used to query and manipulate the application environment.

Snapshots provide a detailed picture of a given application at a certain point in time. Snapshots usually include call graphs that allow that enables drilling down to the line of code that may be causing performance problems. The most common snapshots are transaction snapshots.

Figure 4:
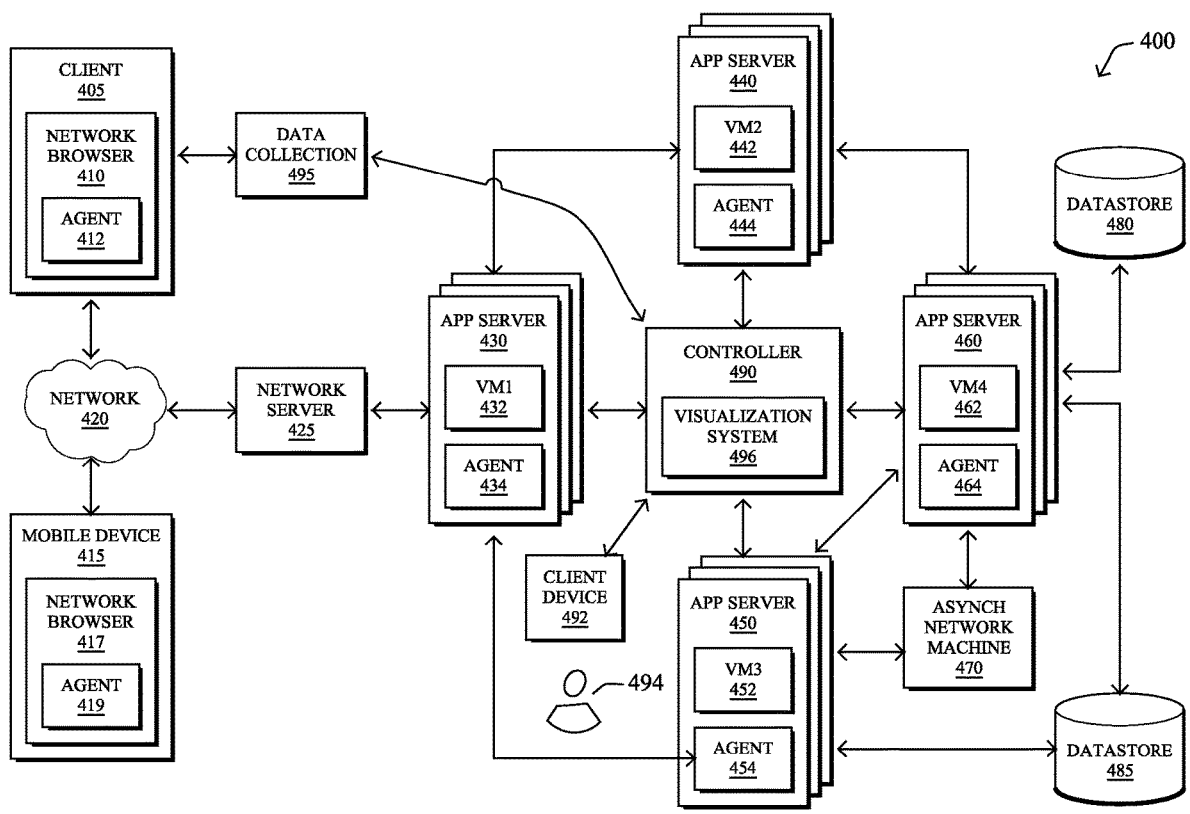
FIG. 4 illustrates an example system for implementing the example application intelligence platform.

FIG. 4 illustrates an example application intelligence platform (system) 400 for performing one or more aspects of the techniques herein. The system 400 in FIG. 4 includes client 405, client device 492, mobile device 415, network 420, network server 425, application servers 430, 440, 450, and 460, asynchronous network machine 470, data stores 480 and 485, controller 490, and data collection server 495. The controller 490 can include visualization system 496 for providing displaying of the report generated for performing the field name recommendations for field extraction as disclosed in the present disclosure. In some implementations, the visualization system 496 can be implemented in a separate machine (e.g., a server) different from the one hosting the controller 490.

Client 405 may include network browser 410 and be implemented as a computing device, such as for example a laptop, desktop, workstation, or some other computing device. Network browser 410 may be a client application for viewing content provided by an application server, such as application server 430 via network server 425 over network 420.

Network browser 410 may include agent 412. Agent 412 may be installed on network browser 410 and/or client 405 as a network browser add-on, downloading the application to the server, or in some other manner. Agent 412 may be executed to monitor network browser 410, the operating system of client 405, and any other application, API, or another component of client 405. Agent 412 may determine network browser navigation timing metrics, access browser cookies, monitor code, and transmit data to data collection server 495, controller 490, or another device. Agent 412 may perform other operations related to monitoring a request or a network at client 405 as discussed herein including report generating.

Mobile device 415 is connected to network 420 and may be implemented as a portable device suitable for sending and receiving content over a network, such as for example a mobile phone, smart phone, tablet computer, or other portable device. Both client 405 and mobile device 415 may include hardware and/or software configured to access a web service provided by network server 425.

Mobile device 415 may include network browser 417 and an agent 419. Mobile device may also include client applications and other code that may be monitored by agent 419. Agent 419 may reside in and/or communicate with network browser 417, as well as communicate with other applications, an operating system, APIs and other hardware and software on mobile device 415. Agent 419 may have similar functionality as that described herein for agent 412 on client 405, and may report data to data collection server 495 and/or controller 490.

Network 420 may facilitate communication of data among different servers, devices and machines of system 400 (some connections shown with lines to network 420, some not shown). The network may be implemented as a private network, public network, intranet, the Internet, a cellular network, Wi-Fi network, VoIP network, or a combination of one or more of these networks. The network 420 may include one or more machines such as load balance machines and other machines.

Network server 425 is connected to network 420 and may receive and process requests received over network 420. Network server 425 may be implemented as one or more servers implementing a network service, and may be implemented on the same machine as application server 430 or one or more separate machines. When network 420 is the Internet, network server 425 may be implemented as a web server.

Application server 430 communicates with network server 425, application servers 440 and 450, and controller 490. Application server 450 may also communicate with other machines and devices (not illustrated in FIG. 4). Application server 430 may host an application or portions of a distributed application. The host application 432 may be in one of many platforms, such as including a Java, PHP, .Net, and Node.JS, be implemented as a Java virtual machine, or include some other host type. Application server 430 may also include one or more agents 434 (i.e., "modules"), including a language agent, machine agent, and network agent, and other software modules. Application server 430 may be implemented as one server or multiple servers as illustrated in FIG. 4.

Application 432 and other software on application server 430 may be instrumented using byte code insertion, or byte code instrumentation (BCI), to modify the object code of the application or other software. The instrumented object code may include code used to detect calls received by application 432, calls sent by application 432, and communicate with agent 434 during execution of the application. BCI may also be used to monitor one or more sockets of the application and/or application server in order to monitor the socket and capture packets coming over the socket.

In some embodiments, server 430 may include applications and/or code other than a virtual machine. For example, servers 430, 440, 450, and 460 may each include Java code, .Net code, PHP code, Ruby code, C code, C++ or other binary code to implement applications and process requests received from a remote source. References to a virtual machine with respect to an application server are intended to be for exemplary purposes only.

Agents 434 on application server 430 may be installed, downloaded, embedded, or otherwise provided on application server 430. For example, agents 434 may be provided in server 430 by instrumentation of object code, downloading the agents to the server, or in some other manner. Agent 434 may be executed to monitor application server 430, monitor application 432 running in a virtual machine (or other program language, such as a PHP, .Net, or C program), machine resources, network layer data, and communicate with byte instrumented code on application server 430 and one or more applications on application server 430.

Each of agents 434, 444, 454, and 464 may include one or more agents, such as language agents, machine agents, and network agents. A language agent may be a type of agent that is suitable to run on a particular host. Examples of language agents include a Java agent, .Net agent, PHP agent, and other agents. The machine agent may collect data from a particular machine on which it is installed. A network agent may capture network information, such as data collected from a socket.

Agent 434 may detect operations such as receiving calls and sending requests by application server 430, resource usage, and incoming packets. Agent 434 may receive data, process the data, for example by aggregating data into metrics, and transmit the data and/or metrics to controller 490. Agent 434 may perform other operations related to monitoring applications and application server 430 as discussed herein. For example, agent 434 may identify other applications, share business transaction data, aggregate detected runtime data, and other operations.

An agent may operate to monitor a node, tier of nodes, or other entity. A node may be a software program or a hardware component (e.g., memory, processor, and so on). A tier of nodes may include a plurality of nodes which may process a similar business transaction, may be located on the same server, may be associated with each other in some other way, or may not be associated with each other.

A language agent may be an agent suitable to instrument or modify, collect data from, and reside on a host. The host may be a Java, PHP, .Net, Node.JS, or other type of platform. Language agents may collect flow data as well as data associated with the execution of a particular application. The language agent may instrument the lowest level of the application to gather the flow data. The flow data may indicate which tier is communicating with which tier and on which port. In some instances, the flow data collected from the language agent includes a source IP, a source port, a destination IP, and a destination port. The language agent may report the application data and call chain data to a controller. The language agent may report the collected flow data associated with a particular application to a network agent.

A network agent may be a standalone agent that resides on the host and collects network flow group data. The network flow group data may include a source IP, destination port, destination IP, and protocol information for network flow received by an application on which network agent is installed. The network agent may collect data by intercepting and performing packet capture on packets coming in from one or more network interfaces (e.g., so that data generated/received by all the applications using sockets can be intercepted). The network agent may receive flow data from a language agent that is associated with applications to be monitored. For flows in the flow group data that match flow data provided by the language agent, the network agent rolls up the flow data to determine metrics such as TCP throughput, TCP loss, latency, and bandwidth. The network agent may then report the metrics, flow group data, and call chain data to a controller. The network agent may also make system calls at an application server to determine system information, such as for example a host status check, a network status check, socket status, and other information.

A machine agent, which may be referred to as an infrastructure agent, may reside on the host and collect information regarding the machine which implements the host. A machine agent may collect and generate metrics from information such as processor usage, memory usage, and other hardware information.

Each of the language agent, network agent, and machine agent may report data to the controller. Controller 490 may be implemented as a remote server that communicates with agents located on one or more servers or machines. The controller may receive metrics, call chain data and other data, correlate the received data as part of a distributed transaction, and report the correlated data in the context of a distributed application implemented by one or more monitored applications and occurring over one or more monitored networks. The controller may provide reports, one or more user interfaces, and other information for a user.

Agent 434 may create a request identifier for a request received by server 430 (for example, a request received by a client 405 or mobile device 415 associated with a user or another source). The request identifier may be sent to client 405 or mobile device 415, whichever device sent the request. In embodiments, the request identifier may be created when data is collected and analyzed for a particular business transaction.

Each of application servers 440, 450, and 460 may include an application and agents. Each application may run on the corresponding application server. Each of applications 442, 452, and 462 on application servers 440-460 may operate similarly to application 432 and perform at least a portion of a distributed business transaction. Agents 444, 454, and 464 may monitor applications 442-462, collect and process data at runtime, and communicate with controller 490. The applications 432, 442, 452, and 462 may communicate with each other as part of performing a distributed transaction. Each application may call any application or method of another virtual machine.

Asynchronous network machine 470 may engage in asynchronous communications with one or more application servers, such as application server 450 and 460. For example, application server 450 may transmit several calls or messages to an asynchronous network machine. Rather than communicate back to application server 450, the asynchronous network machine may process the messages and eventually provide a response, such as a processed message, to application server 460. Because there is no return message from the asynchronous network machine to application server 450, the communications among them are asynchronous.

Data stores 480 and 485 may each be accessed by application servers such as application server 460. Data store 485 may also be accessed by application server 450. Each of data stores 480 and 485 may store data, process data, and return queries received from an application server. Each of data stores 480 and 485 may or may not include an agent.

Controller 490 may control and manage monitoring of business transactions distributed over application servers 430-460. In some embodiments, controller 490 may receive application data, including data associated with monitoring client requests at client 405 and mobile device 415, from data collection server 495. In some embodiments, controller 490 may receive application monitoring data and network data from each of agents 412, 419, 434, 444, and 454 (also referred to herein as "application monitoring agents"). Controller 490 may associate portions of business transaction data, communicate with agents to configure collection of data, and provide performance data and reporting through an interface. The interface may be viewed as a web-based interface viewable by client device 492, which may be a mobile device, client device, or any other platform for viewing an interface provided by controller 490. In some embodiments, a client device 492 may directly communicate with controller 490 to view an interface for monitoring data.

Client device 492 may include any computing device, including a mobile device or a client computer such as a desktop, work station or other computing device. Client device 492 may communicate with controller 490 to create and view a custom interface. In some embodiments, controller 490 provides an interface for creating and viewing the custom interface as a content page, e.g., a web page, which may be provided to and rendered through a network browser application on client device 492.

Applications 432, 442, 452, and 462 may be any of several types of applications. Examples of applications that may implement applications 432-462 include a Java, PHP, .Net, Node.JS, and other applications.

Figure 5:
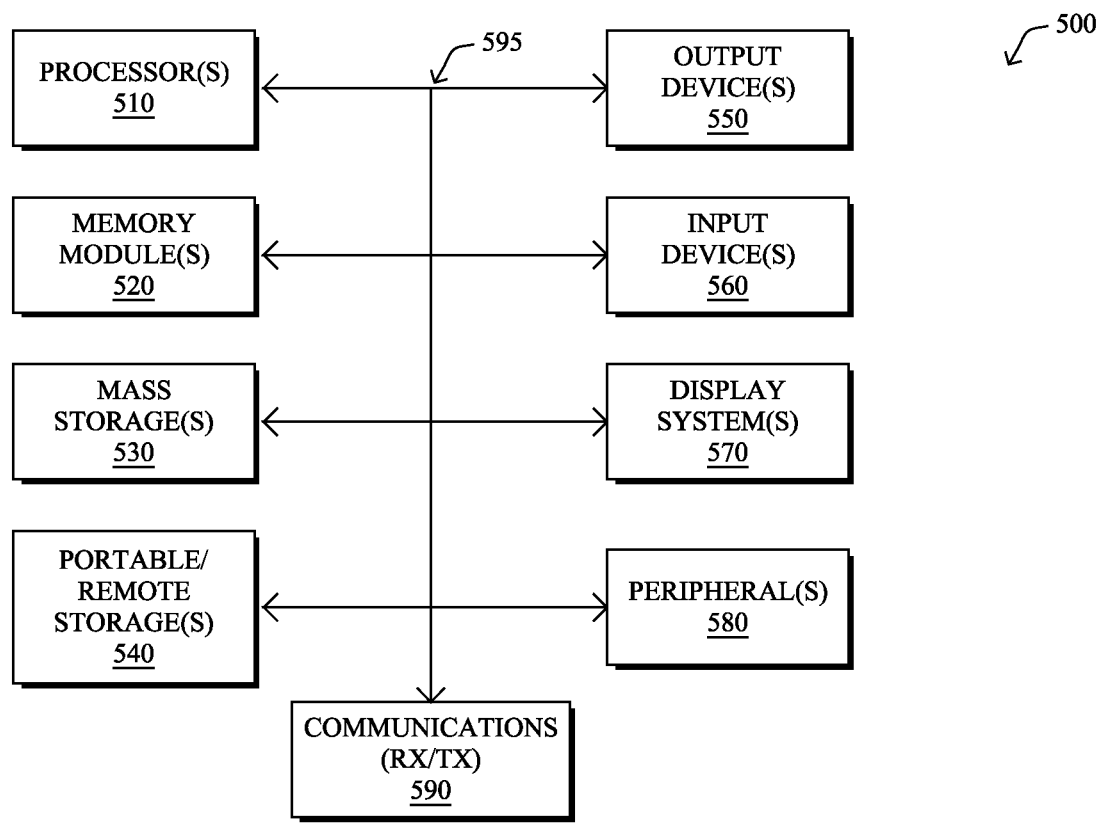
FIG. 5 illustrates an example computing system.

FIG. 5 is a block diagram of a computer system 500 for implementing the present technology, which is a specific implementation of device 200 of FIG. 2 above. System 500 of FIG. 5 may be implemented in the contexts of the likes of client 405, client device 492, network server 425, servers 430, 440, 450, 460, asynchronous network machine 470, and controller 490 of FIG. 4. (Note that the specifically configured system 500 of FIG. 5 and the customized device 200 of FIG. 2 are not meant to be mutually exclusive, and the techniques herein may be performed by any suitably configured computing device.)

The computing system 500 of FIG. 5 includes one or more processor(s) 510 and memory 520. Main memory 520 stores, in part, instructions and data for execution by processor(s) 510. Main memory 520 can store the executable code when in operation. The system 500 of FIG. 5 further includes a mass storage device 530, portable/remote storage(s) 540, output devices 550, user input devices 560, display system(s) 570, and peripheral(s) 580.

The components shown in FIG. 5 are depicted as being connected via a single bus 590. However, the components may be connected through one or more data transport means. For example, processor(s) 510 and main memory 520 may be connected via a local microprocessor bus, and the mass storage device 530, peripheral(s) 580, storage(s) 540, and display system(s) 570 may be connected via one or more input/output (I/O) buses.

Mass storage device 530, which may be implemented with a magnetic disk drive or an optical disk drive, is a non-volatile storage device for storing data and instructions for use by processor(s) 510. Mass storage device 530 can store the system software for implementing embodiments of the present disclosure for purposes of loading that software into main memory 520.

Portable/remote storage(s) 540 may operate in conjunction with a portable non-volatile storage medium, such as a compact disk, digital video disk, magnetic disk, flash storage, etc. to input and output data and code to and from the computer system 500 of FIG. 5. The system software for implementing embodiments of the present disclosure may be stored on such a portable medium and input to the computer system 500 via the storage(s) 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system(s) 570 may include a liquid crystal display (LCD) or other suitable display device. Display system(s) 570 receives textual and graphical information, and processes the information for output to the display device.

Peripheral(s) 580 may include any type of computer support device to add additional functionality to the computer system. For example, peripheral(s) 580 may include a modem or a router.

The components contained in the computer system 500 of FIG. 5 can include a personal computer, hand-held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Apple OS, and other suitable operating systems, including mobile versions.

When implementing a mobile device such as smart phone or tablet computer, the computer system 500 of FIG. 5 may include one or more antennas, radios, and other circuitry for communicating over wireless signals, such as for example communication using Wi-Fi, cellular, or other wireless signals.

As noted above, OpenTelemetry represents a massive shift from proprietary application monitoring systems, such as application performance monitoring (APM) solutions, to an infrastructure that leverages application programming interfaces (APIs) that are standardized and open. OpenTelemetry is also quickly becoming an important cornerstone of the Cloud Native Computing Foundation.

In general, OpenTelemetry is the merging of OpenTracing and OpenCensus, which are two different open source standards projects which conflicted with each other. Essentially, the 'merged' technology of OpenTelemetry is focused on 'Cloud Native Computing' environments and is now part of the Cloud Native Computing Foundation (CNCF). OpenTelemetry represents a huge paradigm shift for Application Monitoring and specifically Application Tracing. By far the most popular and heavily supported platform for OpenTelemetry is Java.

To better illustrate the teachings herein, the following terminology is used:

Trace: a record of activity for a request through a distributed system. A trace is often represented as a Directed Acyclic Graph (DAG) of spans.

Spans: named, timed operations representing a single operation within a trace (e.g., a piece of the workflow). Spans can be nested to form a trace tree. Each trace contains a root span, which typically describes the end-to-end latency and (optionally) one or more sub-spans for its sub-operations. Spans also accept key: value tags as well as fine-grained, timestamped, structured logs attached to a particular span instance.

Metrics: a raw measurement about a service that are captured at runtime. OpenTelemetry defines three metric instruments: counter, measure, and observer. An observer supports an asynchronous API collecting metric data on-demand, once per collection interval.

Span Context: a span includes a span context, which is a set of globally unique identifiers that represent the unique request to which each span belongs, representing the data required for moving trace information across service boundaries. Said differently, a span context includes trace information that accompanies a distributed transaction, including when it passes the service to service over the network or through a message bus. Typically, a span context includes the trace identifier, span identifier, and any other data that the tracing system needs to propagate to the downstream service. OpenTelemetry also supports the correlation context which can carry any user-defined properties. A correlation context is not required, and components may choose not to carry or store this information.

Context Propagation: the means by which context is bundled and transferred between services, typically via HTTP headers. Context propagation is a key part of the OpenTelemetry system, and has some interesting use cases beyond tracing, such as for A/B testing. Note that OpenTelemetry supports multiple protocols for context propagation and to avoid issues, it is important that a single method be used throughout an application. So, for instance, if the W3C specification is used in one service, it should be used throughout the complete system. These are the currently supported options:

3C Trace-Context HTTP Propagator

W3C Correlation-Context HTTP Propagator

B3 Zipkin HTTP Propagator

FIG. 6 illustrates an example of a distributed transaction 600, according to various embodiments. As shown, assume that distributed transaction 600 begins at a first service, Service A, and is handed off via a network call to a second service, Service B, as time progresses. In such a case, tracing distributed transaction 600 using OpenTelemetry will result in a parent span for the execution of distributed transaction 600 by Service A that spans several child spans. In addition, the network call to pass distributed transaction 600 to Service B will also result in a span context. This allows the tracing of distributed transaction 600 to continue as a child span of the parent span that began at Service A.

Those skilled in the art will appreciate that other configurations of observability intelligence may be used in accordance with certain aspects of the techniques herein, and that other types of agents, instrumentations, tests, controllers, and so on may be used to collect data and/or metrics of the network(s) and/or application(s) herein. Also, while the description illustrates certain configurations, communication links, network devices, and so on, it is expressly contemplated that various processes may be embodied across multiple devices, on different devices, utilizing additional devices, and so on, and the views shown herein are merely simplified examples that are not meant to be limiting to the scope of the present disclosure.

A key challenge that may arise in the above scenarios is providing a simplified methodology for configuration of metrics in an observability platform. For example, because users are generally tasked with having a detailed and up-to-date understanding of data streams in the network in order to instruct the observability platform to ingest the correct data from those streams for analysis, configuration of metrics in an observability platform is typically a complicated task. Further, some approaches do not provide the ability to preview the desired data and transformation, thereby exacerbating the configuration of metrics in an observability platform. Accordingly, the present disclosure allows for simplified configuration of metrics with data preview.

Simplifying Configuration of Metrics with Data Preview

This innovation pertains to simplification of the configuration of metrics (e.g., performance indicators) to serve a purpose of a user of an observability platform. In various embodiments, the innovation is facilitated by allowing for the selection of measurements, such as transaction spans, trace data, data streams, etc. for ingestion by s the observability platform. Once the measurement(s) are selected, a transformation can be applied to the measurements that have been ingested by the observability platform, and the results of the transformation can be inspected prior to storing the configuration.

As mentioned above, current approaches generally require users to configure their indicators by making assumptions about the data and then storing the desired configuration. However, in such approaches, if there is a mistake in the configuration, either the data doesn't show up or the data shows unexpected and/or incorrect results. This can result in the user being forced to figure out the correct configuration through a trial-and-error method, which can negatively impact the user experience.

In contrast, aspects of the present disclosure provide a deterministic methodology is for solving these and other issues in current approaches. For example, in the various embodiments, a solution where, as part of the zero-day configuration, incoming data is collected at periodic intervals and stored for a relatively short period of time. As discussed in more detail below, this temporary storage could be provided in the form of an event store index which would have a very short retention period (e.g., on the order of two hours). As an example, if the user is sending observability data in the form of transaction spans, while processing the spans, the span attributes are harvested and stored in the form of a trace event.

In this example, when the user tries to configure the template for the desired metric on a trace, a user interface sends a query to request all span events for the retention period (e.g., two hours in this non-limiting example). The event store then returns all the events and a schema for the events. This allows the user interface to populate the attribute list and the data type of the attributes. Finally, logic is used to prevent misconfigurations by making sure that the aggregation function selected applies to the data type of the attribute. In some embodiments, the aggregation function can be a "count" aggregation, which applies to all data types (e.g., strings, floats, integers, etc.), or the aggregation function can be a "sum" aggregation, which applies to float data types and integer data types.

As discussed herein, the storage of the data (e.g., in the event store) advantageously occurs before the user has done any configuration or specification of the data to be stored. This allows for simplification of the configuration of metrics while optimizing the accuracy of data returned to the observability platform using the configuration metrics. Once the user completes the configuration (e.g., once the user instructs the observability platform how to process and display the data), the event data is stored in an index with longer retention than the event store mentioned above. Furthermore, aspects of the present disclosure can allow for simplification of selecting and storing particular data streams for a longer term (which could imply an increased expense), by allowing the data streams to be previewed prior to selecting the configuration for the observability platform. Moreover, aspects of the present disclosure allow for configuration of data type conversion (e.g., string to integer, etc.) and can allow the user to inspect the results of such conversions.

By providing a methodology to preview the data and apply the transformation in real-time to prevent configuration errors, aspects of the present disclosure provide an improvement to network environments in which an observability platform is operating. For example, by not requiring the user to determine the correct configuration (e.g., through a trial-and-error process), simplification of the configuration of metrics is provided in accordance with the disclosure. Further, aspects of the present disclosure provide a "low-cost" solution to the deficiencies of previous approaches because the data is retained in the event store for a relatively short period of time. It is noted that, while examples discussed herein primarily focus on the configuration of a metric in an observability platform, aspects of the present disclosure are application to any type of analytics workflow. Further, aspects of the present disclosure provide the ability to propagate such configuration (e.g., configurations derived using the preview techniques described herein) directly to agents to capture and process only relevant data that users deem insightful.

Illustratively, the techniques described herein may be performed by hardware, software, and/or firmware, such as in accordance with network metric configuration process 248, which may include computer executable instructions executed by the processor 220 (or independent processor of interfaces 210) to perform functions relating to the techniques described herein.

Specifically, according to various embodiments, a device identifies a set of attributes from telemetry data generated by one or more agents regarding an online application accessible via a network. The device provides an interactive display to a user interface that includes options for a user to specify a selection of one or more attributes from the set of attributes and to specify an aggregation function. The device updates the interactive display to show a visualization of the aggregation function applied to the selection of one or more attributes and configures the one or more agents to collect only a subset of the telemetry data based on the selection of the one or more attributes and the aggregation function.

Figure 7:
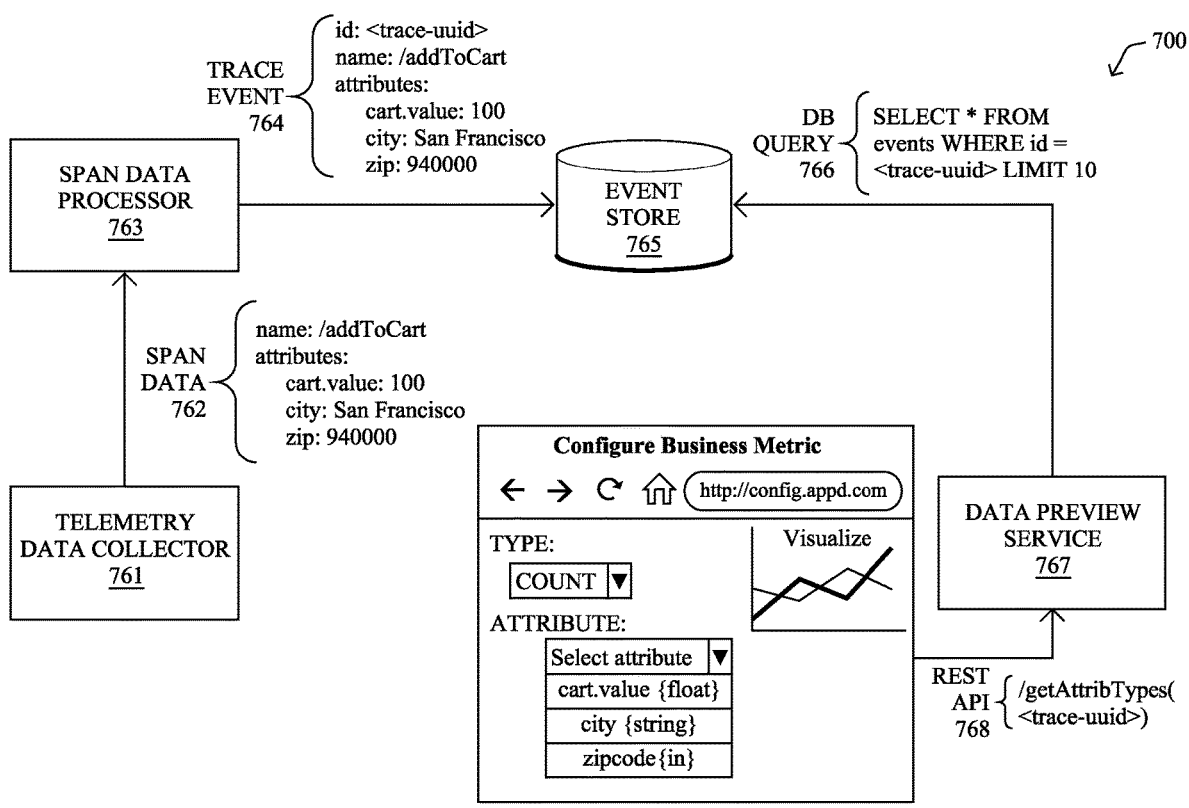
FIG. 7 illustrates an example network observability system for simplifying configuration of metrics with data preview.

Operationally, FIG. 7 illustrates an example network observability system 700 for simplifying configuration of metrics with data preview. As shown in FIG. 7, a telemetry data collector 761 collects telemetry data from a network and provides the telemetry data to a span data processor 763. The telemetry data collector 761 and the span data processor 763 can include hardware configured to execute instructions to, in the case of the telemetry data collector 761, collect telemetry data from the network and/or process the telemetry data, and, in the case of the span data processor 763, process the telemetry data to generate a trace event as shown at 764. As illustrated in FIG. 7, the telemetry data can include span data, such as the span data illustrated at 762. It is noted that the enumerated span data shown at 762 and the enumerated data associated with the trace shown at 764 are merely illustrative and other types of telemetry data, such as telemetry data having different attributes can be collected by the telemetry data collector 461 and provided to the span data processor 763 and/or provided by the span data processor 763 as part of the trace event shown at 764. In some embodiments, the data associated with the trace event shown at 764 includes attributes corresponding to the span data shown at 762.

The data associated with the trace event shown at 764 is stored in an event store 765. As will be appreciated, the event store 765 can be configured to collect and store data corresponding to events that occur during operation of a network in which the observability system 700 is deployed. In some embodiments, the event store 765 collects the data associated with the trace event shown at 764 periodically and stores the data associated with the trace event shown at 764 for a relatively short period of time (e.g., 1 hour, 2 hours, 3 hours, etc.). Upon expiry of the period of time, the data may be deleted from the event store 765. It is important to note that the data associated with the trace event shown at 764 is stored in the event store 765 prior to a user of the observability system 700 performing any configuration and prior to the user specifying any data to be stored in the event store 765.

As shown in FIG. 7, the network observability system 700 includes a user interface 760, which can be analogous to user interface 330 of FIG. 3. The user interface 760 can be provided to configure and/or display business metrics in accordance with the disclosure. In some embodiments, the user interface 760 allows for selection of attributes (e.g., via a drop-down menu or the like), which can be characterized as integers, floats, and/or strings. In the non-limiting example illustrated in FIG. 7, the selectable attributes include a "cart.value" (in float format), a "city" (in string format), and a "zip code" (in integer format), although embodiments are not so limited.

The user interface 760 further includes a selectable field corresponding to a type of business metric. In the non-limiting example illustrated in FIG. 7, the selectable type of business metric is a "count," although embodiments are not so limited. In addition, the user interface 760 of FIG. 7 can include a visualization pane in which business metrics are displayed for consumption by a user or system administrator of the network observability system 700.

Figure 8:
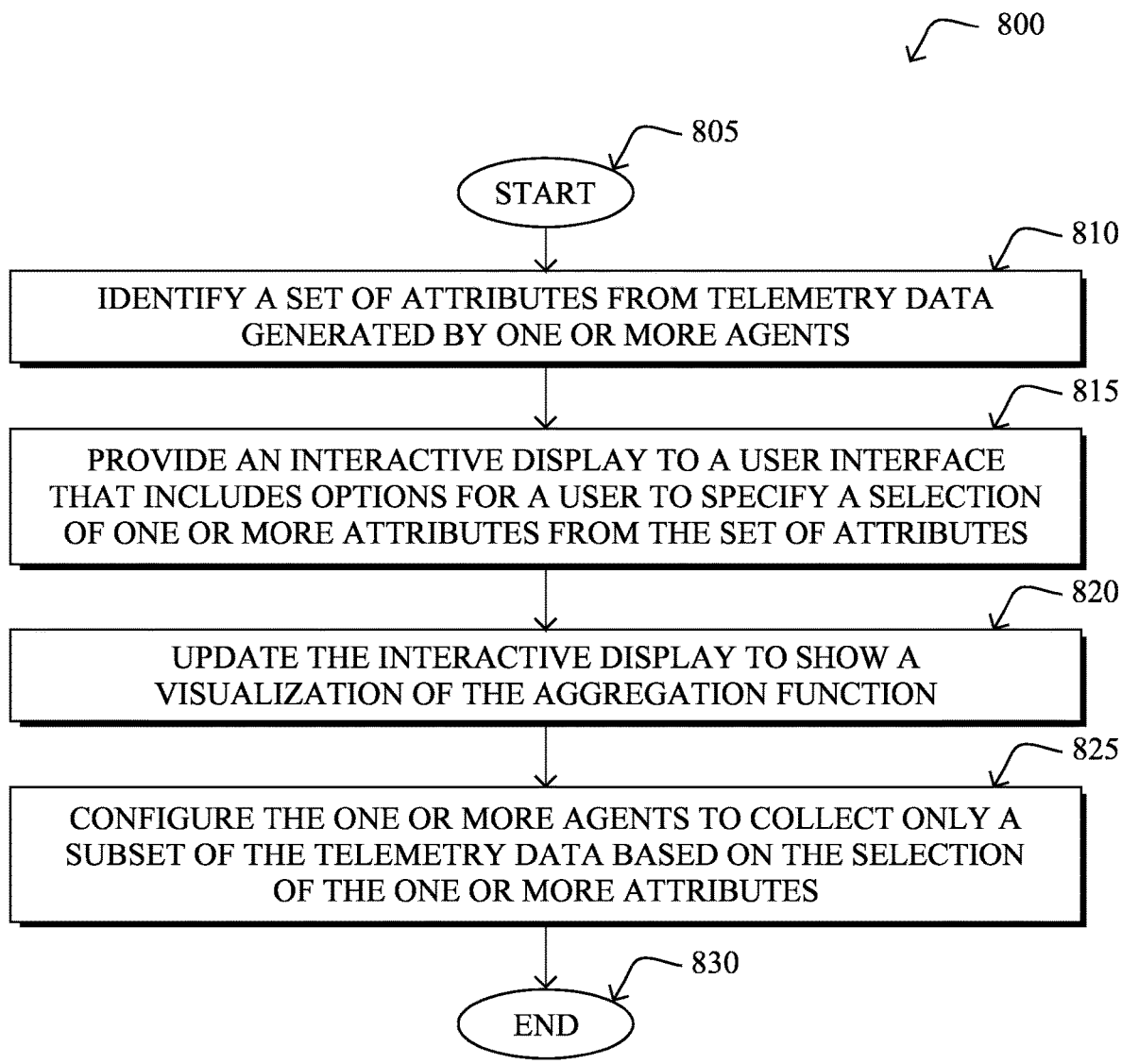
FIG. 8 illustrates an example simplified procedure for simplifying configuration of metrics with data preview.

FIG. 8 illustrates an example simplified procedure 800 (e.g., a method) for simplifying configuration of metrics with data preview. For example, a non-generic, specifically configured device for simplifying configuration of metrics with data preview (e.g., device 200), may perform procedure 800 by executing stored instructions (e.g., network metric configuration process 248). The procedure 800 may start at step 805, and continues to step 810, where, as described in greater detail above, the device (e.g., a controller, processor, etc.) may identify a set of attributes from telemetry data generated by one or more agents regarding an online application accessible via a network.

As discussed above, in some embodiments, the telemetry data can be provided as a transaction span. Further, the device may identify the set of attributes from telemetry data generated by the one or more agents regarding the online application accessible via a network in the absence of a command from a user of the device. As discussed above, the device may identify the set of attributes from telemetry data generated by the one or more agents regarding the online application accessible via the network periodically.

At step 815, as detailed above, the device may provide an interactive display to a user interface that includes options for a user to specify a selection of one or more attributes from the set of attributes and to specify an aggregation function. In various embodiments, the aggregation function comprises a count aggregation function that applies to string data types, float data types, and integer data types. Embodiments are not so limited, however, and in some embodiments, the aggregation function comprises a sum aggregation function that applies to float data types and integer data types.

At step 820, the device may update the interactive display to show a visualization of the aggregation function applied to the selection of one or more attributes.

At step 825, as detailed above, the device may configure the one or more agents to collect only a subset of the telemetry data based on the selection of the one or more attributes and the aggregation function.

Procedure 800 then ends at step 830.

In various embodiments, the telemetry data generated by the one or more agents is stored in an event store for a predetermined period of time in the absence of a command from a user of the device. As discussed above, the predetermined period of time may be on the order of a couple hours. Accordingly, in some embodiments, the predetermined period of time can be two hours or less.

As detailed above, in various embodiments, the device may provide a preview of the one or more attributes from the set of attributes in real-time via the interactive display and configure the one or more agents to collect only the subset of the telemetry data based on the preview of the one or more attributes. In addition to, or in the alternative, in some embodiments, the device may configure a conversion operation involving the one or more attributes from the set of attributes to alter a data type associated with the one or more attributes from a first data type to a second data type and provide a preview of a result of the conversion operation via the interactive display.

Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for simplifying configuration of metrics with data preview in an observability system. More specifically, by allowing for the auto-discovery data (e.g., data streams) in a network, an observability system can be configured to derive insights from the data without requiring that a user of the network possesses a detailed and up-to-date understanding of the existing data streams, thereby greatly simplifying the configuration of the observability system.

While there have been shown and described illustrative embodiments that provide for simplifying configuration of metrics with data preview, it is to be understood that various other adaptations and modifications may be made within the intent and scope of the embodiments herein. For example, while certain embodiments are described herein with respect to configuration of a metric in an observability platform, aspects of the present disclosure are application to any type of analytics workflow, in other embodiments. In addition, while certain processes and protocols are shown, other suitable processes and protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/

RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method comprising:
identifying, by a device, a set of attributes from telemetry data generated by one or more agents regarding an online application accessible via a network;
providing, by the device, an interactive display to a user interface that includes options for a user to specify a selection of one or more attributes from the set of attributes and to specify an aggregation function;
updating, by the device, the interactive display to show a visualization of the aggregation function applied to the selection of one or more attributes; and
configuring, by the device, the one or more agents to collect only a subset of the telemetry data based on the selection of the one or more attributes and the aggregation function.

2. The method of claim 1, further comprising storing the telemetry data generated by the one or more agents in an event store for a predetermined period of time in an absence of a command from a user of the device.

3. The method of claim 2, wherein the predetermined period of time is two hours or less.

4. The method of claim 1, wherein the telemetry data is provided as a transaction span.

5. The method of claim 1, further comprising:
providing, by the device, a preview of the one or more attributes from the set of attributes in real-time via the interactive display; and
configuring, by the device, the one or more agents to collect only the subset of the telemetry data based on the preview of the one or more attributes.

6. The method of claim 1, further comprising:
configuring, by the device, a conversion operation involving the one or more attributes from the set of attributes to alter a data type associated with the one or more attributes from a first data type to a second data type; and
providing, by the device, a preview of a result of the conversion operation via the interactive display.

7. The method of claim 1, further comprising identifying, by the device, the set of attributes from telemetry data generated by the one or more agents regarding the online application accessible via a network in an absence of a command from a user of the device.

8. The method of claim 1, further comprising identifying, by the device, the set of attributes from telemetry data generated by the one or more agents regarding the online application accessible via the network periodically.

9. The method of claim 1, wherein the aggregation function comprises a count aggregation function that applies to string data types, float data types, and integer data types.

10. The method of claim 1, wherein the aggregation function comprises a sum aggregation function that applies to float data types and integer data types.

11. An apparatus, comprising:
one or more network interfaces to communicate with a network;
a processor coupled to the one or more network interfaces and configured to execute one or more processes; and
a memory configured to store a process that is executable by the processor, the process, when executed, configured to:
identify a set of attributes from telemetry data generated by one or more agents regarding an online application accessible via a network;
provide an interactive display to a user interface that includes options for a user to specify a selection of one or more attributes from the set of attributes and to specify an aggregation function;
update the interactive display to show a visualization of the aggregation function applied to the selection of one or more attributes; and
configure the one or more agents to collect only a subset of the telemetry data based on the selection of the one or more attributes and the aggregation function.

12. The apparatus of claim 11, wherein the process, when executed, is configured to store the telemetry data generated by the one or more agents in an event store for a predetermined period of time in an absence of a command from a user.

13. The apparatus of claim 12, wherein the predetermined period of time is two hours or less.

14. The apparatus of claim 11, wherein the telemetry data is provided as a transaction span.

15. The apparatus of claim 11, wherein the process, when executed, is configured to:
provide a preview of the one or more attributes from the set of attributes in real-time via the interactive display; and
configure the one or more agents to collect only the subset of the telemetry data based on the preview of the one or more attributes.

16. The apparatus of claim 11, wherein the process, when executed, is configured to:
configure a conversion operation involving the one or more attributes from the set of attributes to alter a data type associated with the one or more attributes from a first data type to a second data type; and
provide a preview of a result of the conversion operation via the interactive display.

17. The apparatus of claim 11, wherein the process, when executed, is configured to identify the set of attributes from telemetry data generated by the one or more agents regarding the online application accessible via a network in an absence of a command from a user.

18. The apparatus of claim 11, wherein the process, when executed, is configured to identify the set of attributes from telemetry data generated by the one or more agents regarding the online application accessible via the network.

19. The apparatus of claim 11, wherein:
the aggregation function comprises a count aggregation function that applies to string data types, float data types, and integer data types, or
the aggregation function comprises a sum aggregation function that applies to float data types and integer data types.

20. A tangible, non-transitory, computer-readable medium storing program instructions that cause a device to execute a process comprising:
identifying, by a device, a set of attributes from telemetry data generated by one or more agents regarding an online application accessible via a network;

providing, by the device, an interactive display to a user interface that includes options for a user to specify a selection of one or more attributes from the set of attributes and to specify an aggregation function;

updating, by the device, the interactive display to show a visualization of the aggregation function applied to the selection of one or more attributes; and configuring, by the device, the one or more agents to collect only a subset of the telemetry data based on the selection of the one or more attributes and the aggregation function.

* * * * *